UNITED STATES PATENT OFFICE.

FRED M. LOCKE, OF VICTOR, NEW YORK.

MANUFACTURE OF SPAR INSULATORS.

No. 12,992. Specification of Reissued Letters Patent. Reissued July 13, 1909.

Original No. 907,155, dated December 22, 1908, Serial No. 288,974. Application for reissue filed May 17, 1909. Serial No. 497,138.

*To all whom it may concern:*

Be it known that I, FRED M. LOCKE, of Victor, in the county of Ontario, in the State of New York, have invented new and useful Improvements in the Manufacture of Spar Insulators, of which the following is a full, clear, and exact description.

This invention relates to the manufacture of feldspar insulators for high potential electric conductors in which pure mineral or artificial feldspar in its natural state is brought to a pliable or moldable condition by the application of heat and is then molded into the desired form of insulator and allowed to cool.

I am aware that it is common practice to manufacture glass insulators under heat and then molding the fluent into the desired form, but I believe I am the first to produce a purely feldspar insulator or one in which feldspar forms the basic element and that I am the first to discover its superior insulating qualities under all climatic conditions such as thermal changes and varying conditions of humidity of the atmosphere.

It is well known that glass is highly resistive to electric conductivity or puncturability by high potential currents, but it is equally well known that the fragile nature of glass renders it impracticable for use in the manufacture of large high potential insulators owing to its susceptibility to expansion and contraction and consequent breakage under varying climatic conditions or temperatures and also to the fact that, when punctured by an electric current, it usually goes to pieces, thereby rendering it unfit to perform any further function as an insulator or support for the conductor.

Owing to its extreme fragility, glass insulators have largely been substituted by what is commonly known as porcelain which is more tenacious and homogeneous and is, therefore, less fragile and capable of withstanding greater climatic and temperature changes without breaking but is nevertheless less resistive to puncture and static discharges. I have, therefore, sought to produce an insulator which possesses not only the high resistive power of glass together with the toughness and homogeneity of porcelain, but one which is not materially affected by varying climatic changes or temperatures and which retains its integrity even though punctured by electric current, and also reduces static discharges to a minimum which is scarcely perceptible under extremely high voltage electric currents. In other words, my object is to economically produce a cellular insulator having the non-puncturable or highly resistive quality of glass together with a mechanical strength equal or superior to that of porcelain so that it may be used in all climates for the support of electric conductors carrying the highest voltage currents without liability of disintegration, destructive puncturability or excessive static discharges and while the insulator is specifically adapted for high voltage conductors, it may be economically manufactured and sold for use as an ordinary insulator for low voltage conductors.

In the manufacture of these insulators mineral feldspar is placed in a suitable receptacle and reduced by heat to a pliable homogeneous condition, in which it is susceptible of being molded into any form desired. After it has been reduced to this condition the material is placed within a mold having the desired shape, and formed. Taking, by way of example, potash-spar, which is a member of the feldspar group, it has been found that it will as a rule be reduced to the condition required at a temperature of 8 pyrometric cone, but other members of the group are reduced to the condition described at different temperatures. This fusion of the feldspar drives off the gas and causes the particles or minute globules to knit or adhere with greater tenacity, leaving a homogenous mass with innumerable minute cells formed presumably by the liberated gases and which are uniformly distributed throughout the solidity of the molded mass. This produces what may be termed a cellular structure although the cells are scarcely perceptible to the naked eye.

From the experiments which I have thus far conducted, I am convinced that the superior insulating qualities and mechanical strength of an insulator thus formed is due to its uniform cellular nature, and although cellular in its general structure or body, its surface appears to be practically impervious to moisture, which is highly important in preventing static discharges and current leakages.

After the material has been brought to a molten state, it is found to be extremely pliable, but not in liquid form and when subjected to pressure, it appears to be more or less elastic like soft rubber, but if this pressure is continued, it is found to retain the form into which it is pressed so that an insulator may be readily molded by placing a pliable molten mass between suitable molds which are brought together under pressure and maintained until the molded article is sufficiently cooled to retain its shape, whereupon the pressure and dies are removed and the insulator is then complete, ready for use. In some instances, however, it may be advisable to glaze the surface of the insulator to add additional insulating properties, but the essential feature of my invention is to produce a cellular insulator, preferably from any feldspar.

What I claim is:

In the manufacture of insulators, subjecting common feldspar to sufficient temperature to reduce such feldspar to a homogeneous pliable condition, then molding the heated pliable feldspar into an insulator of the desired form and allowing it to cool while still in the mold.

FRED M. LOCKE.

Witnesses:
D. GURNEE,
L. THON.